United States Patent [19]

Strutzel et al.

[11] 4,243,724
[45] Jan. 6, 1981

[54] THERMOPLASTIC MULTI-LAYER FILM

[75] Inventors: Hans Strutzel; Klaus Hoheisel; Siegfried Janocha, all of Wiesbaden, Fed. Rep. of Germany

[73] Assignee: Hoechst Aktiengesellschaft, Frankfurt am Main, Fed. Rep. of Germany

[21] Appl. No.: 910,143

[22] Filed: May 26, 1978

[30] Foreign Application Priority Data

May 28, 1977 [DE] Fed. Rep. of Germany ....... 2724253

[51] Int. Cl.$^3$ .................. B32B 27/34; B32B 27/32
[52] U.S. Cl. .................................................. 428/474.7
[58] Field of Search ......... 428/474 S, 474 SN, 474 U, 428/475.8, 474.7; 260/857 L, 857 UN

[56] References Cited

U.S. PATENT DOCUMENTS

| 3,762,986 | 10/1973 | Bhuta et al. | 156/331 |
| 3,843,479 | 10/1974 | Matsunami et al. | 428/474 |
| 3,975,463 | 8/1976 | Hirata et al. | 268/857 L |

Primary Examiner—George F. Lesmes
Assistant Examiner—E. Rollins Buffalow
Attorney, Agent, or Firm—Schwartz, Jeffery, Schwaab, Mack, Blumenthal & Koch

[57] ABSTRACT

Disclosed is a multi-layer film having two or more layers, comprising at least one first layer of a polymer comprising a linear polyamide, and at least one second layer of a polymer comprising a linear polyamide containing from about 2 to 40 percent by weight of a hydrophilic substance compatible with the polyamide, such as polyvinyl alcohol.

20 Claims, 2 Drawing Figures

THERMOPLASTIC MULTI-LAYER FILM

BACKGROUND OF THE INVENTION

The present invention relates to a multi-layer film based on polyamides, which comprises at least two layers and has improved physical properties as compared to prior art films, and which may be used for packaging purposes.

From U.S. Pat. No. 3,762,986 multi-layer films are known which are based on various polyamides and are made up of structures according to the systems A/B/A, A/B, or B/A/B. In this case, the A layers represent polyamides having melting points below 200° C., e.g., polyamide 11 or polyamide 12, whereas the B layers represent polyamides having melting points above 200° C., e.g., polyamide 6, polyamide 6,6 or polyamide 6,10.

These composite films exhibit a low permeability to moisture, but their permeability to, e.g., oxygen is relatively high. The permeation values (in $cm^3/m^2 \cdot d \cdot bar$ for 40 $\mu m$ thick films) range, e.g., for polyamide 12 from about 300 to 380 and for polyamide 11 from about 160 to 200. For many applications this permeability to oxygen is still too high to prevent adverse effects on the goods packed due to oxidation. Problems may also be encountered concerning the adhesion values between the individual layers, as the films are produced by coextrusion.

U.S. Pat. No. 3,093,255 discloses the preparation of mixtures of polyamides (e.g., of polyamide 6 or polyamide 6,6) and polyethylene, which may, for example, be used for manufacturing films or for blow molding bottles. Although these products have a low permeability to gases, measurements have shown that the permeability to oxygen still exceeds 500 $cm^3/m^{2 \cdot d \cdot bar}$ for 40 $\mu m$ thick films. As indicated above, these high permeation values cannot be tolerated in many applications. This United States patent does not mention the manufacture of composite films. It is only stated that the bottles produced may be coated with polyvinylidene chloride, thus reducing their permeability. However, such coatings must be regarded as critical for ecological reasons, since toxic vapors are generated when the shaped articles are destroyed in combustion plants.

In German Offenlegungsschrift No. 25 51 023 a polymer mixture is described which is composed of 60 to 90 parts by weight of polyamide, 40 to 10 parts by weight of polyethylene, and 1.8 to 8.0 parts by weight of a plastic graft copolymer. In this case, it is merely mentioned that mixtures of this kind may be used for the manufacture of wire insulations or shaped articles.

The journal "Kunststoffe", Volume 65, Number 3, pages 139 to 143 reports investigations conducted on plastic mixtures of polyamide 6 and high-pressure polyethylene; but it is not possible to infer from this report any suggestion for producing films or even composite films using these mixtures.

SUMMARY OF THE INVENTION

It is, therefore, an object of the present invention to provide an improved multi-layer film product.

Another object is to provide a multi-layer film, especially for packaging purposes, which has an extremely low permeability to gases, in particular oxygen, and to vapors, in particular water vapor.

It is also an object of the invention to provide a multi-layer film in which, at the same time, the adhesion between the individual layers is very high, without the additional use of an adhesive, i.e., it is very difficult to separate the film into its individual layers.

In accomplishing the foregoing objectives, there has been provided in accordance with the present invention a multi-layer film having two or more layers, comprising at least one first layer of a polymer comprising a linear polyamide, and at least one second layer of a polymer comprising a linear polyamide containing from about 2 to 40 percent by weight of a hydrophilic substance compatible with the polyamide, such as polyvinyl alcohol which is obtained by 50 to 100 mol percent saponification of polyvinyl acetate and usually shows a degree of polymerization of 500 to 2000. The method for producing PVA is described, for example, in U.S. Pat. No. 3,440,316 and in U.S. Pat. No. 3,409,598, the disclosures of which are hereby incorporated by reference. Preferably PVA is in a partially saponified form including less than 15 percent of unsaponified ester groups.

In a preferred embodiment, the polyamide containing the hydrophilic substance comprises a polyamide having 4 to 6 carbon atoms in each unit, most preferably polyamide 6.

According to one preferred aspect of the invention, the first polyamide layer comprises a polyamide having 9 to 12 carbon atoms in each unit, e.g., polyamide 11 or polyamide 12, and is bonded to the second polyamide layer containing the hydrophilic substance. In another preferred aspect, the first polyamide layer contacts the second polyamide film containing the hydrophilic substance and comprises a polymer blend of polyamide and polyethylene, e.g., polyamide 6 and a low density polyethylene.

Other objects, features and advantages of the present invention will become readily apparent from the detailed description of preferred embodiments which follows, when considered together with the attached figures of drawing.

DETAILED DESCRIPTION OF PREFERRED EMBODIMENTS

Figure 1:
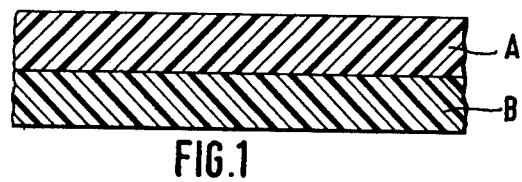
FIG. 1 is a cross-sectional view of a two-layer film according to the invention comprising the layers A and B.
Figure 2:
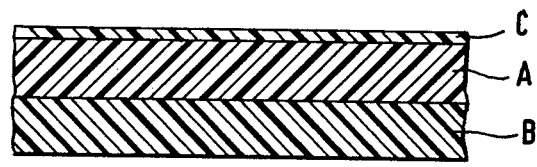
FIG. 2 is a cross-sectional view of a three-layer film according to the invention comprising the layers A, B and C, wherein the thinner layer C may, for example, be a heat sealing layer or a layer applied to improve the strength of the film.

The present invention provides a multi-layer film based on polyamides, comprising at least two layers, with at least two of the layers being made up of linear polyamides. This multi-layer film is characterized by the feature that at least one layer is composed of a linear polyamide containing 2 to 40, preferably 5 to 20 percent by weight of a hydrophilic substance compatible with the polyamide.

A considerable number of substances which are compatible with the polyamide may be employed, but it has been found that polyvinyl alcohol is especially suitable. In practice, polyvinyl alcohol in a partially saponified form containing less than 15 percent of unsaponified ester groups has proved particularly useful.

Although all usual types of polyamides may be used as the polyamides containing the hydrophilic substance, those containing 4 to 6 carbon atoms in each unit are preferred within the scope of the present invention. Of these polyamide 6 is particularly preferred.

At a calculated thickness of 40 μm, the multi-layer films preferably have a permeability value of <25, in particular <20 cm$^3$/m$^2$·d·bar for oxygen, and <50, in particular <20 g/m$^2$·d for water vapor.

The polyamide layer which is bonded to the polyamide layer containing the hydrophilic substance is preferably composed of polyamides having 9 to 12 carbon atoms in each unit, with polyamide 11 or polyamide 12 being particularly useful. However, since the last-mentioned polyamides are relatively expensive, it is preferred, according to the present invention, to substitute these polyamides by polymer blends composed of polyamides and polyethylene. Suitable polymer blends are in particular those comprising 25 to 75, preferably 40 to 60 percent by weight of polyamide and 75 to 25, preferably 60 to 40 percent by weight of polyethylene. As far as the properties sought after are concerned, particularly good results are achieved when polymer blends of polyamide 6 and, preferably, a low-density polyethylene (high-pressure polyethylene) are used.

In order to obtain particular physical properties, for example, with a view toward ultimate tensile strength and/or suitability for printing and/or sealability, it is intended, within the scope of the invention, to apply additional layers, preferably composed of polyesters, polypropylene or sealing layers, for example, based on polyethylene.

The films are preferably used in a non-oriented form, but they may also be oriented in at least one direction to obtain particular physical properties, for example, an increased ultimate tensile strength. For this purpose, the known stretching methods are employed. The films may also be heat set to obtain a heat stable film, and this is also done according to known methods.

The total thickness of the multi-layer film ranges from about 15 μm to 250 μm, with the range between 20 μm and 120 μm being preferred. The multi-layer films according to the invention are particularly suitable for packaging purposes, where it is important to have a low permeability to oxygen or water vapor or where a high resistance to the transmission of flavor is desired. The films may be produced according to the known techniques, for example, by laminating, melt coating and other processes. Coextrusion is, however, preferred.

Below, the invention is more fully explained in detail by means of illustrative examples, however, without limiting it to the embodiments described therein.

EXAMPLE 1

A three-layer film is prepared by coextrusion. The two external layers have a thickness of 10 μm each and are composed of polyamide 12 having a melting range from 176° to 180° C. and a viscosity of 250 ml/g. The inner layer consists of a polymer blend composed of 175 parts by weight of polyamide 6 having a melting range from 217° to 221° C. and a viscosity of 255 ml/g, and 25 parts by weight of a polyvinyl alcohol having a viscosity of $1.8 \times 10^{-2}$ Pa·s and a degree of hydrolysis of 88 percent. The inner film has a thickness of 30 μm.

EXAMPLE 2

A two-layer film is prepared by coextrusion. One of the layers has a thickness of 25 μm and is composed of a polymer blend of 25 parts by weight of polyamide 6 having a viscosity of 255 ml/g and a melting range from 217° to 221° C., and 75 parts by weight of polyethylene having a density of 0.922.

The other layer is composed of a polymer blend of 90 parts by weight of the above-mentioned polyamide 6 and 10 parts by weight of the polyvinyl alcohol of Example 1. The film thickness is 40 μm.

EXAMPLE 3

A two-layer film is prepared by coextrusion. One of the layers has a thickness of 10 μm and is composed of the polyamide 6 mentioned in Example 2, and the other layer has a thickness of 30 μm and is composed of a polymer blend of 95 parts by weight of the same polyamide 6 and 5 parts by weight of the polyvinyl alcohol of Example 1.

EXAMPLE 4

A two-layer film is prepared by coextrusion. One of the layers has a thickness of 38 μm and is composed of a polymer blend containing equal parts by weight of the polyamide 6 mentioned in Example 2 and polyethylene, the other layer has a thickness of 30 μm and is composed of 90 parts by weight of the polyamide 6 of Example 2 and 10 parts by weight of the polyvinyl alcohol of Example 2.

By melt laminating, this two-layer film is bonded to a biaxially stretched and heat set polyethylene terephthalate film having a thickness of 12 μm.

EXAMPLE 5

A three-layer film is prepared by coextrusion. The first layer has a thickness of 40 μm and consists of a polyethylene having a density of 0.930. The middle layer has a thickness of 10 μm and is composed of a polymer blend of 60 parts by weight of the polyamide 6 mentioned in Example 1 and 40 parts by weight of the polyethylene of Example 2. The third layer has a thickness of 40 μm and is composed of a polymer blend of 95 parts by weight of the polyamide 6 mentioned in Example 1 and 5 parts by weight of the polyvinyl alcohol mentioned in the same example.

EXAMPLE 6

A two-layer film is prepared by melt coating. One layer has a thickness of 30 μm and is composed of the polymer blend of Example 5, consisting of polyamide 6 and polyvinyl alcohol. The second layer has a thickness of 30 μm and is composed of 30 parts by weight of the polyamide 6 mentioned in Example 1 and 70 parts by weight of a Zn-containing ionomer having a density of 0.94. Zn-containing ionomers are described, for example, in "The Science and Technology of Polymer Films", Wiley-Interscience, New York 1971, page 654, the disclosure of which is hereby incorporated by reference.

EXAMPLE 7

A two-layer film is prepared by coextrusion. One of the layers has a thickness of 40 μm and is composed of the polymer blend mentioned in Example 5, consisting of polyamide 6 and polyvinyl alcohol, and the other layer is 10 μm thick and is composed of the polymer blend of Example 4, consisting of polyamide 6 and polyethylene. To this two-layer film a 70 μm thick unstretched polypropylene film is laminated, which has a density of 0.9.

The viscosity measurements for the products mentioned in the examples are carried out according to DIN 53729 in the case of polyamide 12 and according to DIN 53727 in the case of polyamide 6, and the polyvinyl alcohol is measured as a 4 percent strength aqueous solution according to DIN 53015.

The polymer blends are prepared using the appropriate known plastification equipment, such as disc compressors or, preferably, single or multiple screw extruders.

The adhesion values and the values for the permeation of oxygen and water vapor are listed in the table which follows. These values show the good barrier properties of the films according to the present invention in comparison to prior art films.

TABLE

| Example | Adhesion (N/10mm) | Permeation calculated for a total thickness of 40 μm | |
|---|---|---|---|
| | | $H_2O$ (g/m$^2$ · d) | $O_2$ (cm$^3$/m$^2$ · bar · d) |
| 1 | 1.0 | 18 | 18 |
| 2 | 2.1 | 8 | 17 |
| 3 | 3.1 | 40 | 8 |
| 4 | 2.2 | 10 | 24 |
| 5 | 2.0/0.5 | 2 | 18 |
| 6 | 1.8 | 7 | 20 |
| 7 | 2.0/0.4 | 3 | 24 |

The values are calculated for a total film thickness of 40 μm (calculated thickness) to obtain absolutely comparable values. The relatively high value for the permeation of oxygen in Example 7 can be explained by the great thickness of the polypropylene used to yield a high degree of stiffness.

The adhesion values are determined according to the so-called T-Peel Method which is described in "Adhesive Age", Sept. 1972, page 21.

What is claimed is:

1. A multi-layer film having two or more layers, comprising at least one first layer of a polymer comprising a linear polyamide, and, adjacent to said first layer, at least one second layer of a polymer comprising a major portion of a linear polyamide containing from about 2 to 40 percent by weight of a hydrophilic substance compatible with the polyamide, said hydrophilic substance comprising polyvinyl alcohol.

2. A multi-layer film according to claim 1, wherein the polyvinyl alcohol is comprised of a partially saponified form including less than 15 percent of unsaponified ester groups.

3. A multi-layer film according to claim 1, wherein the polyamide containing the hydrophilic substance comprises a polyamide having 4 to 6 carbon atoms in each unit.

4. A multi-layer film according to claim 3, wherein the polyamide containing the hydrophilic substance comprises polyamide 6.

5. A multi-layer film according to claim 1, having a permeability to oxygen of less than about 25 cm$^3$/m$^2$·d ·bar, at a calculated thickness of 40 μm.

6. A multi-layer film according to claim 1, having a permeability to water vapor of less than about 50 g/m$^2$·d , at a calculated thickness of 40 μm.

7. A multi-layer film according to claim 1, wherein the first polyamide layer is bonded to the second polyamide layer containing the hydrophilic substance and comprises a polyamide having 9 to 12 carbon atoms in each unit.

8. A multi-layer film according to claim 7, wherein the polyamide of said first layer comprises polyamide 11 or polyamide 12.

9. A multi-layer film according to claim 1, wherein the first polyamide layer contacts the second polyamide film containing the hydrophilic substance and comprises a polymer blend of polyamide and polyethylene.

10. A multi-layer film according to claim 9, wherein said polymer blend comprises from about 25 to 75 percent by weight of polyamide and from about 75 to 25 percent by weight of polyethylene.

11. A multi-layer film according to claim 10, wherein said polymer blend comprises from about 40 to 60 percent by weight of polyamide and from about 60 to 40 percent by weight of polyethylene.

12. A multi-layer film according to claim 9, wherein said polymer blend comprises polyamide 6 and polyethylene.

13. A multi-layer film according to claim 9, wherein said polymer blend comprises polyamide 6 and a low-density polyethylene.

14. A multi-layer film according to claim 1, further comprising at least one additional layer of a thermoplastic polymer containing no polyamide.

15. A multi-layer film according to claim 14, wherein said additional layer is at least uniaxially stretched.

16. A multi-layer film according to claim 14, wherein said additional layer is heat set.

17. A multi-layer film according to claim 14, wherein said additional layer forms the outer layer and comprises a heat sealable polymer.

18. A multi-layer film according to claim 1, wherein said film is oriented in at least one direction.

19. A multi-layer film according to claim 1, wherein said film is heat set.

20. A package, comprising an article to be packaged enclosed within a multi-layer film as defined by claim 1.

* * * * *